United States Patent
Le Huerou et al.

(10) Patent No.: US 12,242,439 B2
(45) Date of Patent: Mar. 4, 2025

(54) SYSTEM AND PROCESS FOR DATA ENRICHMENT

(71) Applicant: ORANGE, Issy-les-Moulineaux (FR)

(72) Inventors: Emmanuel Le Huerou, Chatillon (FR); Mikael Szczerbak, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 145 days.

(21) Appl. No.: 17/599,113

(22) PCT Filed: Mar. 20, 2020

(86) PCT No.: PCT/FR2020/050609
§ 371 (c)(1),
(2) Date: Sep. 28, 2021

(87) PCT Pub. No.: WO2020/201662
PCT Pub. Date: Oct. 8, 2020

(65) Prior Publication Data
US 2022/0171749 A1    Jun. 2, 2022

(30) Foreign Application Priority Data
Mar. 29, 2019  (FR) ...................... 1903406

(51) Int. Cl.
G06F 16/21    (2019.01)
G06F 16/215   (2019.01)
G06F 16/28    (2019.01)

(52) U.S. Cl.
CPC .......... *G06F 16/215* (2019.01); *G06F 16/285* (2019.01)

(58) Field of Classification Search
CPC ...... G06F 16/215; G06F 16/285; G06F 16/35; G06F 16/38; G06F 16/21; G06F 16/94;
(Continued)

(56) References Cited

U.S. PATENT DOCUMENTS 9,665,628 B1    5/2017   Dubey et al.
2011/0131130 A1*  6/2011  Griffin ................... G06Q 40/08
                                                       705/38
(Continued)

FOREIGN PATENT DOCUMENTS

CN    106687952 A    5/2017
EP    1426882 A2    6/2004
(Continued)

OTHER PUBLICATIONS

English translation of the Written Opinion of the International Searching Authority dated Jul. 28, 2020 for corresponding International Application No. PCT/FR2020/050609, filed Mar. 20, 2020.
(Continued)

*Primary Examiner* — Kris E Mackes
*Assistant Examiner* — Cecile H Vo
(74) *Attorney, Agent, or Firm* — David D. Brush; Westman, Champlin & Koehler, P.A.

(57) ABSTRACT

A data enrichment process including: a) receiving several sets of data, each set of data including fundamental data and metadata; b) grouping the sets of data based on fundamental data according to a similarity function; c) enriching each set of data with a label which characterizes the group to which the set of data belongs; d) for each enriched set of data, searching for a combination of one part at least of the metadata and the label from the enriched set of data in a database storing sets of data each including metadata and a label; and e) removing the label from the enriched set of data if the combination of one part at least of the metadata and the label from the enriched set of data is absent from the database.

15 Claims, 2 Drawing Sheets

(58) Field of Classification Search
CPC .... G06F 16/383; G06F 16/387; G06F 16/213; G06F 16/258; G06F 40/20; G06F 16/1794; G06F 40/30
See application file for complete search history.

(56) References Cited

U.S. PATENT DOCUMENTS

| | | | |
|---|---|---|---|
| 2014/0006275 A1* | 1/2014 | Hanson | G06Q 20/3223 705/41 |
| 2015/0169991 A1* | 6/2015 | Zhang | G06F 18/23 382/218 |
| 2015/0193533 A1* | 7/2015 | Platt | G06F 16/634 707/723 |
| 2018/0011919 A1* | 1/2018 | Warren | G06F 16/93 |
| 2018/0366106 A1 | 12/2018 | Cai et al. | |
| 2019/0392452 A1* | 12/2019 | Jivraj | G06Q 20/326 |
| 2021/0136169 A1* | 5/2021 | Price | H04L 67/02 |
| 2021/0374754 A1* | 12/2021 | Pandian | G06N 3/08 |
| 2022/0035862 A1* | 2/2022 | Ben-Natan | G06V 10/776 |

FOREIGN PATENT DOCUMENTS

| | | |
|---|---|---|
| WO | 0225479 A1 | 3/2002 |
| WO | 2016049437 A9 | 3/2017 |

OTHER PUBLICATIONS

International Search Report dated Jul. 8, 2020 for corresponding International Application No. PCT/FR2020/050609, filed Mar. 20, 2020.
Written Opinion of the International Searching Authority dated Jul. 8, 2020 for corresponding International Application No. PCT/FR2020/050609, filed Mar. 20, 2020.
Second Office Action issued Jul. 26, 2024 for corresponding Chinese Patent Application No. 202080035793.4.

* cited by examiner

FIG. 1

SYSTEM AND PROCESS FOR DATA ENRICHMENT

CROSS-REFERENCE TO RELATED APPLICATIONS

This Application is a Section 371 National Stage Application of International Application No. PCT/FR2020/050609, filed Mar. 20, 2020, the content of which is incorporated herein by reference in its entirety, and published as WO 2020/201662 on Oct. 8, 2020, not in English.

FIELD OF THE DISCLOSURE

The field of the invention relates to the enrichment of data, in particular when there is a risk of the data comprising imprecisions or errors due to the conditions of transmitting and receiving these data. One of the main applications of the invention relates in particular to mobile banking.

BACKGROUND OF THE DISCLOSURE

When data are transmitted, there is a risk that they may be compromised and errors or imprecisions result from the transfer of the data fairly often. These errors or imprecisions in the data can be present at the source but may also be introduced on transmitting or receiving.

The need to make the received data reliable is an important issue in all systems in which the transfer of data, sometimes repeatedly, is inevitable. In particular, the mobile banking field, which designates all types of financial services accessible from mobile equipment connected to a wide area network, such as for example a mobile phone, is a field in which data transfers are frequent and the recovery of these data is a necessary condition for implementing the services. In this specific field, the transferred data may comprise information such as the description of a merchant, their activity code, their location, their name, etc. It is then necessary to confirm the reliability of these data for the proper operation of the services when the data could comprise errors.

SUMMARY

The present invention aims to improve the situation.

As such, the present invention relates to a process for data enrichment implemented in computer means and comprising:
a) receiving several sets of data, each set of data comprising fundamental data and metadata related to the fundamental data;
b) grouping the sets of data based on fundamental data respectively associated with the sets of data according to a similarity function;
c) enriching each set of data with additional data called label which characterizing the group to which the set of data belongs;
d) for each enriched set of data, searching for a combination of one part at least of the metadata and the label from the enriched set of data in at least one database storing sets of data each comprising metadata and a label;
e) removing the label from the enriched set of data if the combination of one part at least of the metadata and the label from the enriched set of data is absent from the at least one database.

For example, the fundamental data is a character string, or a sound signal or a digital image.

According to an embodiment, the process further comprises, after receiving sets of data: for each set of data, generating processed data associated with the set of data, by application of a process for reduction of the noise level in the fundamental data. In such an embodiment, the grouping of the sets of data is implemented depending on the processed data respectively associated with the sets of data.

For example, the fundamental data is a character string and the processed data is generated by elimination from the character string of one or more characters from a list of preset characters.

According to an embodiment, the grouping of sets of data uses an unsupervised learning algorithm.

According to an embodiment, each set of data stored in the at least one database further comprises fundamental data and, if the combination of one part at least of the metadata and the label of an enriched set of data is present in the at least one database in a corresponding set of data, the fundamental data from the enriched set of data is replaced if necessary by fundamental data from the corresponding set of data.

According to an embodiment, each set of data stored in the at least one database further comprises fundamental data, and the search is done on a plurality of databases, where each database is characterized by a reliability coefficient, and, if the combination of one part at least of the metadata and the label from the enriched set of data is present in corresponding sets of data respectively stored in databases distinct from the plurality of databases, the label of the enriched set of data is removed if the fundamental data from the enriched set of data is distinct from the fundamental data of the corresponding set of data stored in the database characterized by the largest reliability coefficient.

According to an embodiment, each set of data stored in the at least one database further comprises fundamental data, and the search is done on a plurality of databases, where each database is characterized by a reliability coefficient, and, if the combination of one part at least of the metadata and the label from the enriched set of data is present in corresponding sets of data respectively stored in databases distinct from the plurality of databases, each fundamental data present in at least one of the corresponding sets of data is associated with a similarity factor determined depending on the reliability coefficient of each database storing a corresponding set of data comprising the fundamental data in question, and the label of the enriched set of data is removed if the fundamental data from the enriched set of data is distinct from the fundamental data associated with the highest similarity factor.

According to an embodiment, each metadata from an enriched set of data being associated with a weight, the combination of at least a part of the metadata and the label is present in a database if and only if a value of a presence function, calculated depending on the respective weights of the metadata of the combination present in the database, is greater than or equal to a preset threshold.

According to an embodiment, if, after the search in the at least one database, an enriched set of data keeps the label thereof, the enriched set of data is again enriched by data representative of the similarity function and/or of at least one database within which one part at least of the metadata and the label of the enriched set of data were found.

According to an embodiment, the steps b) to e) are repeated with a new similarity function for the sets of data for which the label was removed, such that a set of data cannot be enriched by a label already attached and then removed previously.

For example, the repetition of the steps b) to e) is limited to a preset maximum number of iterations.

According to an embodiment, the fundamental data relates to an individual or an entity, and the metadata comprise at least contact data for the individual or entity and in which the enriched set of data is transmitted, by means of contact data, to the individual or entity for verification of the attached label.

For example, the contact data are a postal address, a telephone number, electronic address and/or an address for a user account of an application.

The present invention also relates to a computer program comprising instructions for implementing the previously described process when the instructions are executed by at least one processor.

Finally, the present invention targets a data enrichment system comprising:
- a communication module set up for receiving several sets of data, each set of data comprising fundamental data and metadata related to the fundamental data;
- a processing unit set up for:
  - grouping the sets of data based on fundamental data respectively associated with the sets of data according to a similarity function;
  - enriching each set of data with additional data called label which characterizes the group to which said set of data belongs; and
- at least one database configured for storing sets of data each comprising metadata and a label; where the processing unit is further set up for:
  - for each enriched set of data, searching for a combination of one part at least of the metadata and the label from said enriched set of data in the at least one database;
  - removing the label from the enriched set of data if the combination of one part at least of the metadata and the label from the enriched set of data is absent from the at least one database.

BRIEF DESCRIPTION OF THE DRAWINGS

Figure 1:
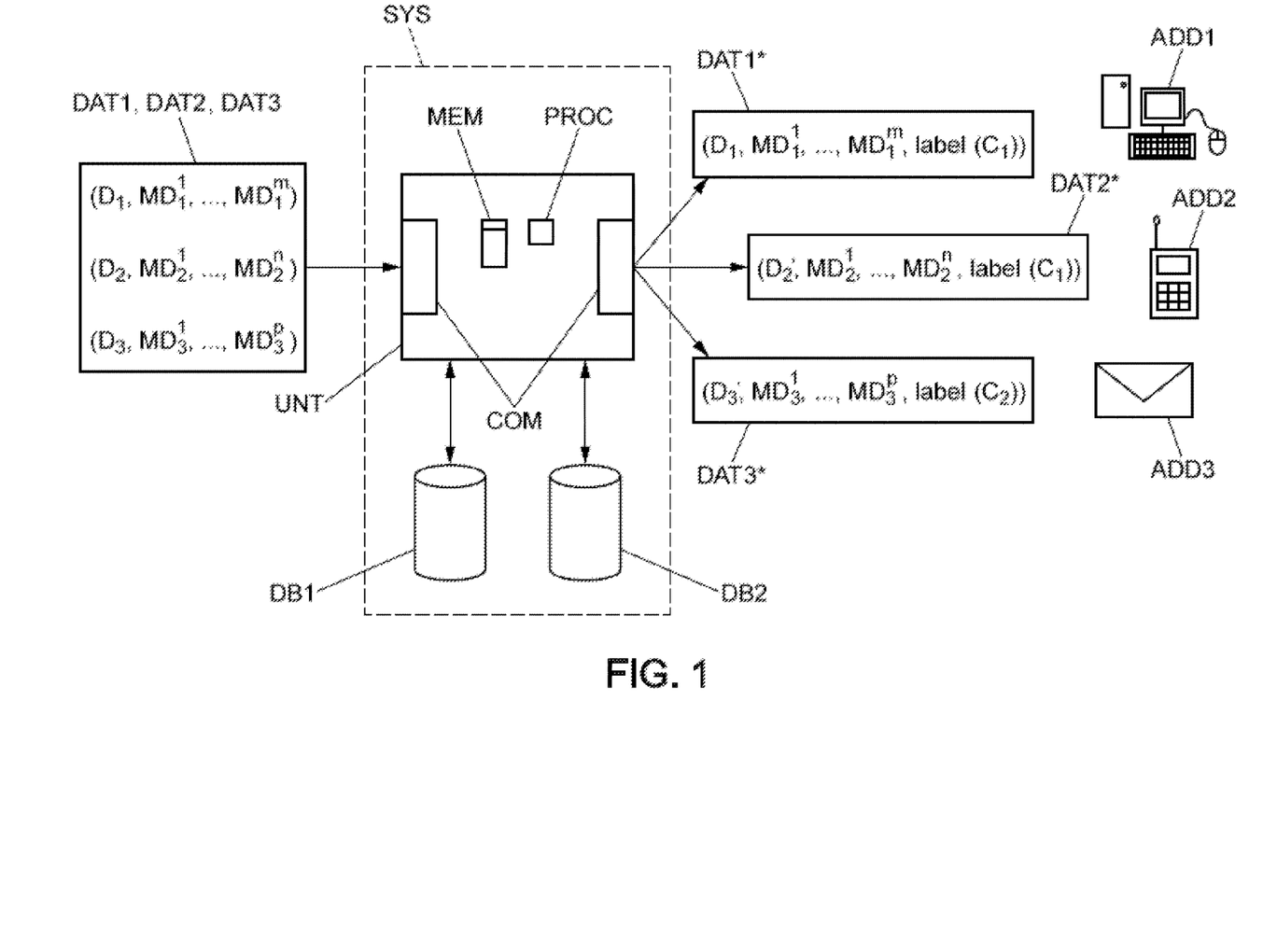
FIG. 1 shows a data enrichment system according to the invention.

Other characteristics, details and advantages of the invention will appear upon reading the following detailed description, and on analysis of the attached drawings, on which:

FIG. 1 shows a data enrichment system, hereafter system SYS, according to the invention.

DETAILED DESCRIPTION OF ILLUSTRATIVE EMBODIMENTS

The system SYS is set up for receiving data having the risk of comprising errors or imprecisions and for enriching these data despite these potential errors or imprecisions.

In the context of the invention, the data received by the system SYS could in fact comprise some level of noise. For example, when the data correspond to a character string, these data could comprise erroneous characters or imprecisions. It is therefore understood here that the noise typically designates any error introduced in a character string at the source, upon transmitting or upon receiving or during transmission of the data.

Typically, in the context of mobile banking, the data received at the input of the system SYS are data allowing a user to access to financial services from mobile equipment, for example a mobile phone. An account can be consulted online or else money transferred using the transferred data. The data may correspond to the description of a merchant, their activity code, their location, and therefore their city, address and postal code, or also their name. In an application domain, for example, some information is limited to a maximum number of characters. The transfer of data representative of such information is necessarily imprecise and incomplete because not all the characters can be filled in. In the present invention, noise refers, for example, to this type of imprecision.

The system SYS is set up to allow provision of the service even when these data comprise errors, sometimes introduced at the source but also on transmitting or on receiving the data.

These data may also be a sound signal comprising noise or a digital image comprising digital noise. The system SYS is set up for enriching the data despite this potential noise.

As shown in FIG. 1, the system SYS comprises a processing unit UNT and at least one database, here two databases DB1, DB2.

The processing unit UNT is set up for, upon receiving several sets of data, enriching each set of data and verifying the pertinence of this enrichment of the data by means of databases DB1, DB2. More specifically, the processing unit UNT is set up for generating, for each received a set of data, additional data called label and attaching or affixing the generated label to the associated set of data. The literature also talks about tag to designate the label.

Further, the processing unit UNT is also set up for applying processing to at least a part of the received data in order to reduce the noise level which the data could comprise.

The processing unit UNT is further set up for, once there is an enriched set of data, routing this set of data to an address in order to allow a user to review the enriched data and verify that these data have been correctly enriched.

In the example shown in FIG. 1, three sets of data DAT1, DAT2, DAT3 are sent to the processing unit UNT.

Each set of data comprises fundamental data $D_1$, $D_2$, $D_3$ and metadata relating to this fundamental data. The metadata accompanying the fundamental data are descriptive data with which to describe or define the fundamental data. For example, in the field of mobile banking, the fundamental data is the description of a merchant while the metadata characterize their activity code, their location or any other information about the merchant in question.

In the example from FIG. 1, the first set of data DAT1 comprises the fundamental data $D_1$ and further comprises metadata $MD_1^1, \ldots, MD_1^m$. The second set of data DAT2 comprises the fundamental data $D_2$ and further comprises metadata $MD_2^1, \ldots, MD_2^n$. Finally, the third set of data DAT3 comprises the fundamental data $D_3$ and further comprises metadata $MD_3^1, \ldots, MD_3^p$. In the preceding notation m, n and p are positive integers designating the respective number of metadata from the first, second and third sets of data DAT1, DAT2, DAT3.

In the context of the invention, the fundamental data for each set of data could have some level of noise and therefore comprise errors or imprecisions.

Of course, the metadata could also have some level of noise. It is understood that the processing applied to the fundamental data by the processing unit UNT for reducing the noise can also be applied to the metadata. In the remainder of the description, focus is given in particular to the case in which the fundamental data can be noisy. As explained later, the processing unit UNT is set up in particular for generating processed data by applying a noise-level reduction processing to the fundamental data from a set of data.

However, it is understood that the metadata can also be noisy and that the processing unit UNT may also be set up for generating new metadata by application of noise-level reduction processing to the received metadata.

Further, again referring to the example shown in FIG. 1, three enriched sets of data DAT1*, DAT2*, DAT3* are generated by the processing unit UNT. As previously explained, the processing unit UNT is more specifically set up for generating, for each received set of data, additional data also called label or tag and for enriching each set of data by attaching or affixing the generated label to it. In the example described here, the first and second sets of data DAT1, DAT2 are enriched by a single label label($C_1$) while the third set of DAT3 is enriched by a label label($C_3$).

The processing unit UNT comprises a communication module COM, a memory MEM and a processor PROC.

The communication module COM is set up for receiving several sets of data. In the example shown in FIG. 1, the communication module COM is set up for receiving the first, second and third sets of data DAT1, DAT2, DAT3.

Additionally, the communication module COM is further set up for transmitting several enriched sets of data. In the example shown in FIG. 1, the communication module COM is set up for emitting the first, second and third enriched sets of data DAT1*, DAT2*, DAT3*.

The person skilled in the art knows that there are many types of data communication networks, for example cellular or non-cellular radio communication networks, and that depending on the embodiment the communication module COM could incorporate one or several communication modules, for example radiofrequency communication, and be configured for transmitting and receiving radiofrequency signals according to one or more technologies such as TDMA, FDMA, OFDMA, CDMA, or one or more radio communication standards such as GSM, EDGE, CDMA, UMTS, HSPA, LTE, LTE-A, WiFi (IEEE 802.11) and WiMAX (IEEE 802.16), or their variants or developments, currently known or subsequently developed.

In other words, the communication module COM is set up for communicating with a wide area network (known under the acronym WAN), or a local area network (known under the acronym LAN), or any other type of network.

The sets of data are, for example, transmitted to the communication module COM of the processing unit UNT following the use of an application. Such an application is typically implemented on a terminal, for example a smartphone type mobile terminal, and is for example intended to be used by a user. For example, the user makes a payment via this application and this payment leads to the generation of one part at least of the data from a set of data, whether it is the fundamental data and/or the metadata. It is typically in such a case that noise may be introduced with errors or imprecisions. For example, the information is character strings. The memory MEM is set up for storing instructions in the form of a computer program whose execution by the processor PROC results in the operation of the processing unit UNT.

The operation of the processor PROC and therefore of the processing unit UNT will be described in detail in the rest of the description referring to FIG. 2.

As previously explained, the system SYS also comprises at least one database. In the example shown in FIG. 1, the system SYS comprises two databases DB1, DB2. Just the same, the person skilled in the art understands here that the system SYS may comprise only a single database.

Each database DB1, DB2 is configured for storing sets of data each comprising metadata and a label. Advantageously, one or more sets of data stored in a database also comprise, fundamental data DB1, DB2 in addition to metadata and a label.

Additionally, each database DB1, DB2 is configured in order to be accessible to the processing unit UNT within the system SYS. As explained in the remainder of the description, this accessibility is seen by the possibility for the processing unit UNT to search within each database DB1, DB2 in order to establish, if possible, a correspondence between an enriched set of data and the sets of data stored within the databases. The purpose of this search is in particular to verify the pertinence of the enrichment of the set of data done and its compliance with the known databases.

As previously explained, one field of application of the invention is mobile banking. In such a context, the databases addressed by the treatment unit UNT in order to verify that a received set of data was correctly enriched is for example a SIREN (for "Système d'identification du répertoire des entreprises" or "Identification System for the Directory of Companies" in English), SIRET (for "Système d'identification du répertoire des établissements" or "Identification System for the Directory of Institutions" in English) type database or even Infogreffe (a system with records from court clerks), which contain information on registration of French businesses. These public databases allow access to data about the identification of a business, a company, a facility, an organization or an association with activities in France. Of course, the person skilled in the art understands that the databases DB1, DB2 may designate any database of this type and not only those for France. Of course, the databases DB1, DB2 may also designate other types of databases accessible by programming interfaces (known as API for "Application Programming Interface").

The process for data enrichment according to the invention is now going to be described with reference to FIG. 2.

In the context of the implementation of the process described below, several sets of data are transmitted to the system SYS as previously described with reference to FIG. 1.

These data are sent to the system SYS, for example, by an Internet type wide-area network or via a local network. This process is typically implemented for purposes of providing a service in the mobile banking context. The set of data then relates, for example, to a business, a company or a merchant and the metadata included in the set of data are informative or descriptive data of a fundamental data containing the description of the business, company or merchant. This fundamental data could, because of the transfer of the set of data, comprise errors or imprecisions and therefore be corrupted by some noise level. This noise may have been introduced at the source, during transmission or even upon receiving.

During a step S1, the system SYS receives several sets of data. More specifically, the sets of data are received by the communication module COM of the processing unit UNT of the system SYS.

As previously explained, in the mobile banking field, the generation of such sets of data is for example triggered by an application on a mobile terminal of the user.

In the example shown in FIG. 1, the communication module receives a first set of data DAT1, a second set of data DAT2 and a third set of data DAT3. Of course this example is purely illustrative and the system SYS may need to process a much larger number of sets of data.

Each set of data comprises fundamental data and metadata relating to this fundamental data. In other words, the metadata serve to define, describe or provide additional information about the fundamental data.

In the example described here, the first set of data DAT1 comprises metadata $MD_1^1, \ldots, MD_1^m$ describing the fundamental data $D_1$. The second set of data DAT2 comprises metadata $MD_2^1, \ldots, MD_2^n$ describing the fundamental data $D_2$. Finally, the third set of data DAT3 comprises metadata $MD_3^1, \ldots, MD_3^p$ describing the fundamental data $D_3$.

Optionally, during a step S2, the processing unit UNT of the system SYS generates for each set of data a processed data associated with the set of data, by application of a process for reduction of the noise level in the fundamental data.

In fact, as previously explained, because of the transfer of the set of data, noise may be introduced in the set of data, and more specifically in the fundamental data, at the source, on transmitting or on receiving.

Implementing the service requiring the correct routing of the set of data is then compromised by such errors or imprecisions.

During this step, processing unit UNT applies any type of data processing with which to reduce the noise level of the fundamental data. The person skilled in the art knows the techniques typically used for reducing the noise level or completely eliminating it from data.

For example, when the fundamental data is a character string, the processed data is generated by elimination from the character string of one or more characters from a list of preset characters. This list of characters is for example stored in the memory MEM of the processing unit UNT, such that, when the processing unit detects a character from this list in fundamental data taking the form of a character string, this character is deleted in order to generate the processed data.

Of course, the fundamental data may also be a sound signal or a digital image. There again, various techniques with which to reduce or eliminate noise in a sound signal or digital image are widely known to the person skilled in the art such that the processing unit UNT may be configured in order to be able to apply such techniques to the fundamental data of each set of data received by the system SYS.

In the present case, the processed data generated by the first set of data DAT1 by reduction of the noise-level of the fundamental data $D_1$ is designated by $D_1'$. Similarly, the processed data generated by the second set of data DAT2 by reduction of the noise-level of the fundamental data $D_2$ is designated by $D_2'$, and the processed data generated by the third set of data DAT3 by reduction of the noise-level of the fundamental data $D_3$ is designated by $D_3'$.

At this stage of the process, the data processed for a set of data can be attached or affixed to the set of data in addition to or in place of the fundamental data, and accompanied by the corresponding metadata.

In the remainder of the description of the process, it is considered that the step S2 was implemented and that the processed data replace the fundamental data. The person skilled in the art understands here that in the embodiment in which this step is not implemented, this processed data is therefore not generated and what is done subsequently by means of the processed data is done by means of the fundamental data. Further, in the case where processed data is generated, this processed data may be identical to the fundamental data. In particular, if the fundamental data does not comprise any noise, the processed data is identical to the fundamental data.

Figure 2:
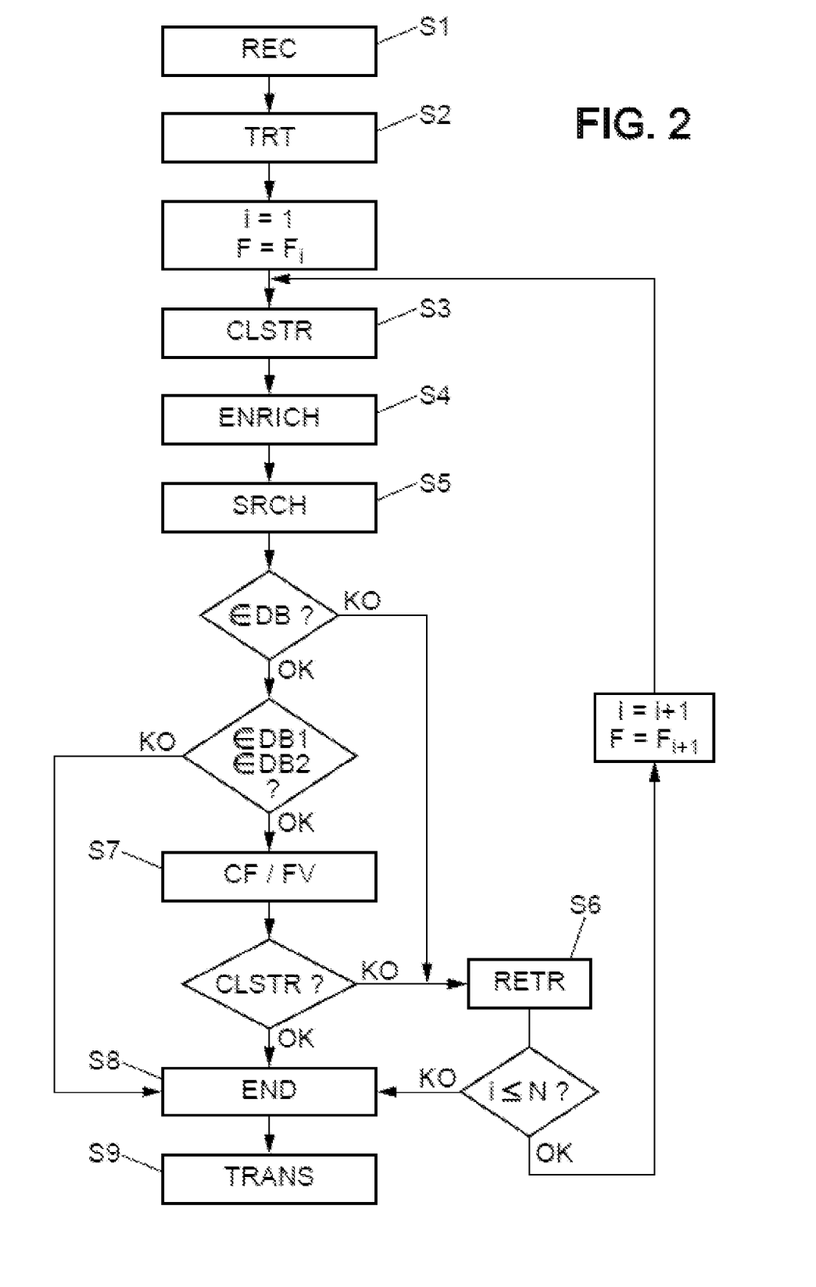
FIG. 2 shows a data enrichment process according to the invention.

Referring to FIG. 2, a counter i, initialized to 1, is now incremented and the similarity function $F_i$ is selected. Advantageously, the memory MEM stores a set of similarity functions.

During a step S3, the processing unit UNT groups the sets of data based on processed data respectively associated with the sets of data according to the similarity function. The grouping of data implemented by the processing unit UNT is better known under the term "data clustering" or more simply "clustering." Here one may also speak of partitioning or clustering of data. There again, the grouping techniques used by the processing unit UNT are techniques known to the person skilled in the art.

Advantageously, the grouping implemented by the processing unit UNT serves to get a large intragroup similarity, specifically a high homogeneity between the elements, here sets of data from a single group, and a low intergroup similarity, in order to have well-differentiated groups.

The grouping or "clustering" techniques used in the context of the implementation of the process are varied. Advantageously the grouping implemented by the processing unit UNT comprises a partitioning algorithm, a hierarchical algorithm, a density-based algorithm, a grid algorithm or even a template algorithm.

Advantageously, the grouping of the sets of data uses an unsupervised learning algorithm. Such algorithms are known to the person skilled in the art.

At the outcome of this step, the sets of data are regrouped by groups, more commonly known by the term "clusters," according to the similarity function used.

Typically, the similarity function is a distance function defined on a space of M+1 dimensions, where M is the number of metadata (M+1 therefore corresponds to the cardinal of a set of data received with M metadata points and one fundamental data point). For example, if the data are digital data, the similarity function may be a Euclidean distance. If the data are characters, typically letters, the similarity function may be a Levenshtein distance. Of course, when some data from a set of data are digital while others are letters, the similarity function may be a combination of a Euclidean distance and a Levenshtein distance. One may then define a threshold such that, when the distance between two sets of data is less than or equal to this threshold, then the two sets of data are grouped together, thus making up part of the same cluster.

Referring again to the example shown in FIG. 1, the first set of data DAT1 and the second set of data DAT2 are grouped in a single group or cluster $C_1$. The third set of data DAT3 is placed, for its part, in a group $C_2$. The first, second and third sets of data DAT1, DAT2, DAT3 were grouped as a function of their respective processed data $D_1', D_2', D_3'$.

As previously explained, generation of the processed data is optional. In that way, when no processed data was generated, the grouping of sets of data is implemented as a function of the respective fundamental data from the sets of data.

During a step S4, the processing unit UNT enriches each set of data with additional data called label which characterizes the group to which the set of data belongs. In other words, at the outcome of grouping a set of data receives additional data characterizing the group within which the set of data in question was classified. It can be considered that this additional data, also called label or tag, is attached or affixed to the set of data.

Again referring to the example shown in FIG. 1, the first and second sets of data reclassified in the same group or cluster $C_1$. These two sets of data DAT1, DAT2 are therefore enriched by the same additional reference label($C_1$). In the same way, since the third set of data DAT3 was classified in the group or cluster $C_2$, it is enriched by the additional data label($C_2$).

During a step S5, for each enriched set of data, the processing unit UNT searches for a combination of one part at least of the metadata and the label from the enriched set of data in at least one database storing sets of data each comprising metadata and a label.

In the illustrative case developed here, for example, the first enriched set DAT1 comprises the fundamental data $D_1$, metadata $MD_1^1, \ldots, MD_1^m$, a label label($C_1$) and optionally the processed data $D_1'$. The purpose of the search done by the processing unit UNT in at least one of the databases DB1, DB2 is therefore to determine whether the combination of a part at least of the metadata $MD_1^1, \ldots, MD_1^m$, and the label label($C_1$) is present in a set of data among the sets of data stored in the database DB1, DB2. Advantageously, such a search is done in all the databases, therefore here the database DB1 and the database DB2.

In the remainder of the description, we will speak of a "corresponding set of data" for designating a set of data stored in a database and comprising the searched for combination. In that way we state that this set of data is a corresponding set of data to the enriched set of data from which the searched for combination came.

Again referring to the process shown in FIG. 2, there are two possibilities for an enriched set of data, either:

such a combination of metadata and label is really present in at least one database; or
such a combination is absent.

Advantageously, in one or more embodiments, a weight is associated with each metadata from an enriched set of data. This weight serves to characterize the importance of metadata within a set of data. The combination of a part at least of the metadata and the label is then considered as present in a database if and only if a value of a presence function, calculated depending on the respective weights of the metadata of the combination present in the database in question, is greater than or equal to a preset threshold.

In other words, in this specific embodiment, an additional criterion is applied for determining whether a set of data stored in a database may be considered as a "corresponding set of data." This criterion consists of verifying whether a potential corresponding set of data is sufficiently significant, according to the metadata that it contains and shares in common with an enriched set of data. Of course, in this specific embodiment it is still necessary that that the label of this potential corresponding set of data be the same as the considered, enriched set of data.

As an example, consider the first set of enriched data DAT1\*. Assume that the metadata $MD_1^1, \ldots, MD_1^m$ are all respectively associated with a weight $P_1^1, \ldots, P_1^m$. Further assume that, in the database DB1, a set of data comprises the metadata $MD_1^1, \ldots, MD_1^k$ and the label label($C_1$), where k is a positive integer strictly less than m. In other words, this set of data found in the database DB1 in fact comprises at least a part of the metadata from the first enriched set of data DAT1\* and also the label label($C_1$). It therefore involves a potential corresponding set of data.

Just the same, in this embodiment, in order to determine whether this potential corresponding set of data is pertinent, the previously described criterion is also applied by calculating the value $V_1$ taken by the presence function, noted G herebelow, for the metadata from the first enriched set of data DAT1\*, and more specifically for the respective weights associated with these metadata. In other words:

$$V_1 = G(P_1^1, \ldots, P_1^k)$$

This value $V_1$ is next compared with a preset threshold and, if this value is greater than or equal to this preset threshold, then the set of data found in the database DB1 is pertinent and is selected as a corresponding set of data.

For example, the presence function G is addition or multiplication.

Still as an example, further assume that, within the database DB2, another combination of a part at least of the metadata and the label from the first enriched data assembly DAT\*1 is found in a set of data, therefore potentially in a corresponding set of data. The metadata shared between this set of data and the first enriched set of data DB1\* may of course be different from those found in the database DB1. For example, the set of data found in the database DB2 comprises the metadata $MD_1^j \ldots, MD_1^m$, where j is a positive integer less than m, and the label label($C_1$).

As with the previous example, the processing unit UNT calculates the value $V_2$ taken by the function G taken for this found combination. In other words:

$$V_2 = G(P_1^j, \ldots, P_1^k)$$

This value $V_2$ is next compared with the preset threshold and, if this value is greater than or equal to this preset threshold, then the set of data found in the database DB2 is pertinent and is selected as a corresponding set of data.

For example, the set of data found in the database DB1 is selected according to this criterion while that found in the database DB2 is not selected.

In the remainder of the description of the process, it is understood that, in this embodiment, a corresponding set of data is not only a set of data is stored in a database comprising the combination of a part at least of the metadata and the label of an enriched set of data, but also a set of data satisfying the criterion previously described about the respective weights of the metadata that it shares with the enriched set of data on the basis of which the search is done by the processing unit UNT.

During a step S6, implemented in particular in the case where a combination of a part at least of the metadata and the label of an enriched set of data is absent from the at least one database, the previously assigned label is removed from the enriched set of data. In other words, because there is no trace in any database of a combination of a part at least of the metadata and the label, it is considered that said label was assigned in error during the grouping with the considered set of data of step S3. The additional data or label which was attached or affixed to said previously enriched set is withdrawn.

Again referring to the case shown in FIG. 1, the second group of data DAT2 is considered, for example. At the outcome of step S4, it was enriched with the supplemental data label($C_1$). The processing unit UNT therefore during the step S5 next searched in at least one of the databases DB1, DB2 whether a set of data stored in one of these databases DB1, DB2 comprises both a part at least of the metadata $MD_2^1, \ldots, MD_2^n$ and the additional data label ($C_1$). If no set of data stored in the databases DB1, DB2 comprises such a combination, the label label($C_1$) is therefore removed from the second enriched set of data DAT2*. Said set, at the outcome of step S5, then only comprises the fundamental data D2, the metadata $MD_2^1, \ldots, MD_2^n$ and, possibly the processed data $D_2'$.

Alternatively, referring to FIG. 2, if the combination of a part at least of the metadata and the label of an enriched set of data is actually present in at least one database, it is determined whether this combination was determined in a dingle database on in several databases. Of course, in an embodiment in which only one database is incorporated in the system SYS and is accessible to the processing unit UNT, a set of data corresponding to the combination of a part at least of the metadata and of the searched for label can only be found in the single database.

Nonetheless, in the case shown for example in FIG. 1, such a search may be done on a plurality of databases, here two databases DB1, DB2 and a corresponding set of data may be found in several different databases. For example, referring to the third enriched set of data DAT3*, the processing unit UNT searched in the database DB1 but also in the database DB2 for a set of data comprising the combination for a part at least of the metadata $MD_3^1, \ldots, MD_3^p$ and of the label label($C_2$). It's entirely possible that one corresponding set of data may have been found in the database DB1, while another corresponding set of data was found in the database DB2. In other words, the processing unit UNT found a set of data is stored in the database DB1 comprising the combination of a part at least of the metadata and the label of the third enriched set of data DAT3* but also found a set of data stored in the database DB2 comprising this same combination of metadata and the label.

In such a case, during this step S7, the processing unit UNT applies a preset criterion for determining whether the result of this search, which ended up finding a corresponding set of data in more than one database of the system SYS, allows concluding in the pertinence of the assigned label or not.

During this step S7, two embodiments are distinguished:

In a first embodiment, each database is characterized by a reliability coefficient. Also, each set of data stored in a database further comprises fundamental data.

The processed data from the considered set of data and the fundamental data from the corresponding set of data stored in the database characterized by the largest reliability coefficient are then compared.

As previously explained, we are in the specific case where, for each set of data, processed data was generated during the optional step S2 and replaces the fundamental data by implementation of the process. It is therefore clear here that, if the processed data had not been generated, then during this step S7, the fundamental data from the considered set of data and the fundamental data from the corresponding set of data stored in the database characterized by the largest reliability coefficient are compared.

For example, still referring to FIG. 1, in which the system SYS comprises two databases DB1, DB2. Because there are several databases, each one is assigned a reliability coefficient with which to quantify the pertinence thereof or reliability thereof. Advantageously, the respective reliability coefficients of two different databases are different. Thus, the database DB1 is characterized by a reliability coefficient CF1; while the database DB2 is characterized by a reliability coefficient CF2. Since it is further considered that the database DB1 is more reliable than the database DB2, it follows that: CF1>CF2.

It is next assumed that the combination of a part at least of the metadata $MD_1^1, \ldots, MD_1^m$ and the additional data label($C_1$) from the first enriched set of data DAT1* was found in a corresponding set of data stored in the database DB1 but also in another corresponding set of data stored in the database DB2. These two corresponding sets therefore each comprise fundamental data. These respective fundamental data may be similar or different.

Given that, among the databases storing a corresponding set of data, the database with the highest reliability coefficient is the database DB1 characterized by the reliability coefficient CF1. During this step S7, in a first embodiment, the processed data $D_1'$ from the first enriched set of data DAT1* is therefore compared to the fundamental data from the corresponding set of data found in the database DB1.

Referring to the data enrichment process shown in FIG. 2, if the combination of a part at least of the metadata and the label from an enriched set of data is present in corresponding sets of data are respectively stored in distinct databases in the plurality of databases, the label of the enriched set of data is removed during the step S6 then implemented by the processing unit UNT, if the processed data from the enriched set of data is distinct from the fundamental data of the corresponding set of data stored in the database characterized by the larger reliability coefficient.

In a second embodiment, each database is there again characterized by a reliability coefficient. Also, each set of data stored in a database further comprises fundamental data.

This time, in this alternative embodiment, the database with the highest reliability coefficient among all the databases comprising a set of data corresponding to the searched for combination isn't the only one considered. In this specific embodiment, the processing unit UNT considers all the databases comprising a corresponding set of data.

Each fundamental data present in at least one of the corresponding sets of data is associated with a likelihood factor determined based on the reliability coefficient of each database storing a corresponding set of data comprising the considered fundamental data.

In order to illustrate this embodiment, we refer again to the example shown in FIG. 1. Further assume that a third database (not shown here) is included in the system SYS and is searched by the processing unit UNT in addition to the databases DB1, DB2. Finally, assume that this third database is characterized by a reliability coefficient CF3. It can also be assumed in this embodiment that the database DB1 is characterized by a reliability coefficient CF1; while the database DB2 is characterized by a reliability coefficient CF2. Advantageously, here again, the respective reliability coefficients of two different databases are different.

It is next assumed that the combination of a part at least of the metadata $MD_3^1, \ldots, MD_3^p$ and the additional data label($C_2$) of the third enriched set of data DAT3* was found in a corresponding set of data stored in the database DB1 but also in a corresponding set of data stored in the database DB2 and in a corresponding set of data stored in the third database. These three corresponding sets therefore each comprise fundamental data. These respective fundamental data may be similar or different.

As an example, it is assumed that the corresponding set of data stored in the database DB1 and the corresponding set of data is stored in the database DB2 comprise the same fundamental data, indicated here by $DF_{1,2}$. In contrast, the corresponding set of data stored in the third database comprises different fundamental data, indicated here by $DF_3$. The processing unit UNT then determines the likelihood factor FV(DF$_{1,2}$) associated with the fundamental data DF$_{1,2}$. This likelihood factor FV(DF$_{1,2}$) is calculated based on reliability coefficients of the database DB1 and the database DB2, specifically CF1 and CF2. Similarly, the processing unit UNT determines the likelihood factor FV(DF$_3$) associated with the fundamental data DF$_3$. This likelihood factor FV(DF$_3$) is calculated based on the reliability coefficient of the third database, specifically CF3.

For example, a likelihood factor is determined by addition of the reliability coefficients. It then follows that:

$$FV(DF_{1,2})=CF1+CF2$$

$$FV(DF_3)=CF3$$

Another possibility can also be to calculate the average of the reliability coefficients in order to calculate the likelihood factor. It then follows that:

$$FV(DF_{1,2})=(CF1+CF2)/2$$

$$FV(DF_3)=CF3$$

The person skilled in the art will understand here that several calculations are possible in order to determine the likelihood factor of the fundamental data as a function of reliability coefficients.

Then, in the example developed here, the processed data D$_3$' from the third enriched set of data DAT3* is compared with the fundamental data associated with the highest likelihood factor.

As previously explained, we are in the specific case where, for each set of data, processed data was generated during the optional step S2 and replaces the fundamental data by implementation of the process. It is therefore clear here that, if the processed data had not been generated, then during this step S7, the fundamental data from the considered set of data and the fundamental data associated with the largest likelihood factor are compared.

Referring to the data enrichment process shown in FIG. 2, if the combination of one part at least of the metadata and the label from the enriched set of data is present in corresponding sets of data respectively stored in databases distinct from the plurality of databases, each fundamental data present in at least one of the corresponding sets of data is associated with a similarity factor determined depending on the reliability coefficient of each database storing a corresponding set of data comprising the fundamental data considered, and the label of the enriched set of data is removed during step S6 then implemented by the processing unit UNT if the processed data from the enriched set of data is distinct from the fundamental data associated with the highest similarity factor.

The step S6, as previously indicated, is implemented for an enriched set of data either following step S5, if it turns out that the combination of a part at least of the metadata and the label for this enriched set of data is not present in any database, or after the step S7 if this combination was found in several databases and it turns out that the assigned label is erroneous. During this step S6, therefore, the label for the enriched set of data is removed.

Next, as shown in FIG. 2, it is determined whether the counter i characterizing the number of iterations of the process is less than or equal to the preset maximum number of iterations N. If this maximum number of iterations is not yet reached, the counter is incremented. Advantageously, when the counter is incremented, a new similarity function, for example stored in the memory MEM of the processing unit UNT, is selected. The steps S3 and following are then repeated with the new similarity function for the sets of data for which the label was removed, such that a set of data cannot be enriched by a label already attached and then removed previously.

As previously explained, a similarity function serves to calculate the distance between two sets of data such that two sets of data are grouped in one group or cluster when the distance between these two sets of data is less than or equal to a certain threshold. Also when a new similarity function is selected, it is also possible to change this threshold, for example by increasing it. Further, it is also possible to keep the same similarity function and only changed the threshold.

On the other hand, if the preset maximum number of iterations N for the process was reached, the processing unit UNT interrupts the loop and goes to step S8 even if some sets of data do not have a label assigned.

Step S8 is implemented at the outcome of step S7 if it is determined that the label assigned to a set of data during enrichment thereof is correct in light of the search done on the at least one database, it is then considered that this set of data was correctly enriched.

The step S8 may also be implemented if the preset maximum number of iterations N for the process was reached.

Further, referring to FIG. 2, the step S8 can also be implemented in the case where, for an enriched set of data, the combination of a part at least of the metadata and the label for this enriched set of data was not found in a single database at the end of step S5. In such a case, when the step S8 is then implemented by the processing unit UNT of the system SYS, the fundamental data in the enriched set of data is replaced if necessary by the fundamental data from the corresponding set of data. Here "necessary" is understood to mean that the fundamental data in the corresponding set of data is different from the enriched set of data. Further, this fundamental data present in the corresponding set of data may correspond to the processed data.

Here, it is understood that the enriched set of data at the output of the system comprises at least either the original fundamental data, or the processed data or the fundamental data found in the corresponding set of data.

Referring to FIG. 1, it is assumed for example that the combination of a part at least of the metadata MD$_2^1$, . . . , MD$_2^n$ and the label label(C$_1$) coming from the second enriched set of data DAT2* was found only in one database, for example the database DB1, therefore in a single corresponding set of data during step S5. During the step S8 implemented immediately afterward, the processing unit UNT then compares the fundamental data D$_2$ from the second enriched set of data DAT2* is compared with the fundamental data from the corresponding set of data stored in the database DB1. If the fundamental data from the corresponding set of data is different from the fundamental data from the second enriched set of data, this latter is then replaced in the second enriched set of data by the fundamental data from the corresponding set of data.

At the end of step S8, therefore, each set of data has undergone at most N iterations of steps S3 and following in order for a consistent label to be assigned in light of the search done on one or more databases of the system SYS. At the outcome of this step, some sets of data are still enriched with supplemental data or a label whereas other sets of data can remain without a label.

Additionally, concerning the enriched sets of data which, at the outcome of step S8, have kept the label thereof because of the positive results of the search in the one or more databases DB1, DB2, or because the combination of a part at least of the metadata and the label were found in just one single database or because this combination was found in several databases and the label in the end appeared correct in light of the search, such enriched sets may also be completed by new metadata coming from the databases.

In fact, as previously explained, the test consists of determining whether, for a set of data, the combination of a part at least of the metadata and the generated label are included in the at least one set of data, called corresponding set of data, from at least one database. But such corresponding sets may obviously comprise other data in addition to the combination sought. These additional metadata may then be recovered by the processing unit UNT in order to advantageously supplement the enriched sets of data.

In the example shown in FIG. 1, the enriched sets of data DAT1*, DAT2*, DAT3* do not comprise supplemental metadata compared to the sets of data DAT1, DAT2, DAT3 received by the system. Just the same, the person skilled in the art understands here that the enriched data may comprise supplemental metadata coming from the databases DB1, DB2.

Still during step S8, advantageously, the enriched sets of data may be again enriched so as to keep, out of concern for traceability, a history of the enrichment of the data and of the search in the databases. For example, an enriched set of data may be supplemented by data representative of the similarity function used for implementing the grouping in step S2.

Still advantageously, an enriched set of data may also or alternatively be supplemented by representative data from the database within which the most pertinent corresponding set is found. Of course, in the more complex cases previously explained in which the combination of a part at least of the metadata and the label from an enriched set was found in several databases, the data added to the enriched set of data during the step S8 may be representative of a part at least of the databases within which these corresponding sets of data are stored.

In that way, an enriched set of data on output from the system SYS may comprise, beyond the label and possibly the processed data with or in place of the original fundamental data, data with which to characterize the various steps of the process having led to the generation and verification of the enriched sets of data.

This additional enrichment of the set of data typically comprises data representative of the similarity function used and/or data representative of the databases within which the corresponding sets are stored.

In other words, if, after the search in the one or more databases, an enriched set of data keeps the label thereof, the enriched set of data in question is again enriched by data representative of the similarity function and/or of at least one database within which one part at least of the metadata and the label of this enriched set of data were found.

During a step S9, optionally implemented at the outcome of the step S8, the metadata from the enriched sets of data are used in order to proceed with the verification of the assigned label. Such verification may also help allow correction, if needed, of the fundamental data.

According to an embodiment, for example in the specific domain of mobile banking, the fundamental data relates to an individual or an entity, and the metadata comprise at least contact data for the individual or the entity. The enriched set of data is sent, by means of the contact data, for verification of the attached label. Here an entity may designate a business, a company, an organization or a facility.

As previously explained, such contact data may already be present in the received set of data and then enriched, but may also be recovered in one of the databases DB1, DB2 if the search result is satisfactory. Typically, when the metadata from an enriched set of data at the outcome of step S4 does not comprise contact data with which to subsequently send the enriched set of data for verification, such contact data is searched for in the one or more corresponding sets within the one or more databases.

Referring to FIG. 1, the enriched sets of data are processed before transmitting in order to keep in a database either the fundamental data such as received by the communication module COM or the processed data, or the fundamental data recovered. For example, in the first enriched set of data DAT1*, only the received fundamental data $D_1$ is retained. In the second enriched of data DAT2*, only the generated processed data $D_2'$ is retained. Similarly, in the third enriched set of data DAT3*, only the generated processed data $D_3'$ is retained.

The contact data may for example be a postal address, or phone number and/or an electronic address. In the example described here, it is considered for example that the metadata from the first enriched set of data comprises contact data relating to an electronic address ADD1, the metadata from the second enriched set of data comprises contact data relating to a phone number ADD2, whereas the metadata from the third enriched set of data comprise contact data relating to a postal address ADD3.

For these addresses, it is appropriate to note further that an enriched set of data may, for purposes of verification, be sent obviously to the individual or entity that is the subject of these data but may also be the source of the set of data. For example, by again considering the mobile banking application field, the generation of a set of data and then the transmission to the system SYS may have been triggered by the terminal of the user, for example during a payment. More precisely, these data are generated from a user account of the user on the payment application. These data are not related to the user in question, but to the store, business or company. During the step S9, the enriched set of data may be sent for verification of course to the store, business or company via contact data included in the metadata, but may also, still for verification, also be sent to the user account originating the generation of the set of data as received by the system SYS and more specifically by the communication module COM.

The enriched sets of data are then sent to these addresses provided by the contact data, for example via the communication module COM, so it can proceed with verifications of the label, and possibly of the fundamental/processed data and the transmitted enriched set of data. In particular the processing unit UNT is for example provided with technologies with which to automatically send an email or to use a call bot with which to automatically call the recovered telephone number.

Of course, if a part at least of the data from a set of data turns out after verification to be erroneous, these erroneous data can be corrected and then re-sent to the system SYS. For example, still in the case where a set of data was generated following the payment made by the user via a payment application executed on a terminal, this application also allows them to receive the enriched set of data at the output of the system and to access, at least in part, some data from the enriched set of data for verification purposes. If data, for example the fundamental data or the process data or metadata, is erroneous, the user has the possibility of correcting this data and then sending this correction to the system SYS.

Upon receiving a corrected, enriched set of data, the system SYS may then reimplement some steps of the previously described process. For example, the system SYS may again proceed with regrouping or clustering on several sets of corrected, enriched data or proceed with the new search in one or more databases.

Although the present disclosure has been described with reference to one or more examples, workers skilled in the art will recognize that changes may be made in form and detail without departing from the scope of the disclosure and/or the appended claims.

The invention claimed is:

1. A process for data enrichment implemented by a computing device and comprising the following ordered steps:
   a) receiving, at a communication module of the computing device, several sets of data from a data communication network, each set of data comprising one fundamental datum corresponding to a character string, sound or image, and metadata that describes or defines the fundamental datum, the sets of data received from the data communication network being at risk of containing errors in the data;
   b) grouping, by the computing device, the received sets of data in one or more groups based on the fundamental datum of each set of data according to a similarity function, the similarity function being a distance defined on a space of M+1 dimensions, wherein M is a number of metadata of the received sets of data, the computing device grouping two set of data in a common group when the distance between two sets of data is below a given threshold;
   c) enriching, by the computing device, each received set of data with one additional datum called a label which characterizes the group to which the set of data belongs, the enriching providing an enriched set of data, wherein each metadata from the enriched set of data is associated with a weight;
   d) for each enriched set of data, searching, by the computing device,—for a combination of at least one part of the metadata and the label from the enriched set of data in at least one database, the at least one database storing additional sets of data each comprising metadata and a label;
   e) as a result of the searching, determining, by the computing device, whether the combination of the at least one part of the metadata and the label from the enriched set of data is present or absent from the at least one database, wherein the combination of at least a part of the metadata and the label is present in the at least one database if and only if a value of a presence function, calculated depending on the respective weights of the metadata of the combination present in the database, is greater than or equal to a preset threshold; and
   f) for at least one enriched set of data, in response to determining that the combination of the at least one part of the metadata and the label from the enriched set of data is absent from the at least one database, the computing device determining that the label is an erroneous label for that set of data and consequently the computing device removing the label from the enriched set of data; and
   g) the computing device outputting at least one of the enriched sets of data.

2. The process according to claim 1, further comprising after receiving the several sets of data:
   for each set of data, generating processed data associated with the set of data, by application of a process for reduction of a noise level in the fundamental datum, where the grouping of the sets of data is implemented depending on the processed data respectively associated with the sets of data.

3. The process according to claim 2, wherein the fundamental datum is a character string and the processed data is generated by elimination from the character string of one or more characters from a list of preset characters.

4. The process according to claim 1, wherein the grouping of sets of data uses an unsupervised learning algorithm.

5. The process according to claim 1, wherein each set of data stored in the at least one database further comprises a fundamental datum and, the process further comprises, for at least one of the received sets of data, determining that the combination of one part at least of the metadata and the label of an enriched set of data is present in the at least one database in a corresponding set of data and consequently replacing the fundamental datum from the enriched set of data if necessary by the fundamental datum from the corresponding set of data.

6. The process according to claim 1, wherein each set of data stored in the at least one database further comprises a fundamental datum, wherein:
   searching for a combination of one part at least of the metadata and the label from the enriched set of data is processed on a plurality of databases, where each database is characterized by a reliability coefficient, and
   the process further comprises:
   determining, for at least one of the received sets of data, that the combination of the one part at least of the metadata and the label from the enriched set of data is present in corresponding sets of data respectively stored in databases distinct from the plurality of databases and consequently the label of the enriched set of data is removed if the fundamental datum from the enriched set of data is distinct from the fundamental datum of the corresponding set of data stored in the database characterized by the largest reliability coefficient.

7. The process according to claim 1, wherein each additional set of data stored in the at least one database further comprises a fundamental datum, wherein:
   searching for a combination of one part at least of the metadata and the label from the enriched set of data is processed on a plurality of databases, where each database is characterized by a reliability coefficient, and
   the process further comprises:
   for at least one of the received set of data, determining that the combination of the one part at least of the metadata and the label from the enriched set of data is present in corresponding sets of data respectively stored in databases distinct from the plurality of databases, and consequently each fundamental datum present in at least one of the corresponding sets of data is associated with a similarity factor determined depending on the reliability coefficient of each database storing a corresponding set of data comprising the fundamental datum, and the label of the enriched set of data is removed if the fundamental datum from the enriched set of data is distinct from the fundamental datum associated with the highest similarity factor.

8. The process according to claim 1, wherein if, after the search in the at least one database, the enriched set of data keeps the label thereof, the enriched set of data is again enriched by data representative of at least one of the similarity function or at least one database within which one part at least of the metadata and the label of the enriched set of data were found.

9. The process according to claim 8, wherein the repetition of the acts b) to f) is limited to a preset maximum number of iterations.

10. The process according to claim 1, wherein acts b) to f) are repeated with a new similarity function for the received sets of data for which the label was removed, such that a set of data cannot be enriched by a label already attached and then removed previously.

11. The process according to claim 1, wherein the fundamental datum relates to an individual or an entity, and the metadata comprise at least contact data for the individual or the entity and in which the enriched set of data is transmitted, by using the contact data, to the individual or the entity for verification of the attached label.

12. The process according to claim 11, wherein the contact data comprise at least one of a postal address, a phone number, electronic address or an address for a user account of an application.

13. The process according to claim 1, wherein the outputting comprises for the at least one enriched set of data:
g) after the searching and determining, routing the enriched set of data to an address of a data communication network.

14. A non-transitory computer-readable storage medium comprising a computer program stored thereon comprising instructions for implementing a process for data enrichment, when the instructions are executed by at least one processor of a computing device, wherein the process comprises:
a) receiving, at a communication module of the computing device, several sets of data from a data communication network, each set of data comprising one fundamental datum corresponding to a character string, sound or image, and metadata that describes or defines the fundamental datum, the sets of data received from the data communication network being at risk of containing errors in the data;
b) grouping, by the processor of the computing device, the received sets of data in one or more groups based on the fundamental datum of each set of data according to a similarity function, the similarity function being a distance defined on a space of M+1 dimensions, wherein M is the number of metadata of the received sets of data, the computing device grouping two set of data in a common group when the distance between two sets of data is below a given threshold;
c) enriching, by the processor of the computing device, each received set of data with one additional datum called a label which characterizes the group to which the set of data belongs, the enriching providing an enriched set of data, wherein each metadata from the enriched set of data is associated with a weight;
d) for each enriched set of data, the processor of the computing device searching for a combination of at least one part of the metadata and the label from the enriched set of data in at least one database, the at least one database storing additional sets of data each comprising metadata and a label;
e) as a result of the searching, the processor of the computing device determining whether the combination of the at least one part of the metadata and the label from the enriched set of data is present or absent from the at least one database, wherein the combination of at least a part of the metadata and the label is present in the at least one database if and only if a value of a presence function, calculated depending on the respective weights of the metadata of the combination present in the database, is greater than or equal to a preset threshold; and
f) for at least one enriched set of data, in response to determining that the combination of the one part at least of the metadata and the label from the enriched set of data is absent from the at least one database, the processor of the computing device determining that the label is an erroneous label for that set of data and consequently the processor of the computing device removing the label from the enriched set of data; and
g) the processor of the computing device outputting at least one of the enriched sets of data.

15. A data enrichment system comprising:
a communication module set up to receive several sets of data from a data communication network, each set of data comprising one fundamental datum corresponding to a character string, sound or image, and metadata that describes or defines the fundamental datum, the sets of data received from the data communication network being at risk of containing errors in the data;
a processing unit set up to:
group the received sets of data in one or more groups based on the fundamental datum of each set of data according to a similarity function, the similarity function being a distance defined on a space of M+1 dimensions, wherein M is the number of metadata of the received sets of data, the computing device grouping two set of data in a common group when the distance between two sets of data is below a given threshold;
enrich each received set of data with one additional datum called a label which characterizes the group to which the set of data belongs, the enriching providing an enriched set of data, wherein each metadata from the enriched set of data is associated with a weight; and
at least one database configured to store additional sets of data each comprising metadata and a label;
where the processing unit is further set up to:
for each enriched set of data, search for a combination of at least one part of the metadata and the label from the enriched set of data in the at least one database;
as a result of the searching, determining whether the combination of the at least one part of the metadata and the label from the enriched set of data is present or absent from the at least one database, wherein the combination of at least a part of the metadata and the label is present in the at least one database if and only if a value of a presence function, calculated depending on the respective weights of the metadata of the combination present in the database, is greater than or equal to a preset threshold;
for at least one of the enriched sets of data, in response to determining that the combination of the at least one part of the metadata and the label from the enriched set of data is absent from the at least one database, determining that the label is an erroneous label for that set of data and consequently removing the label from the enriched set of data; and
outputting at least one of the enriched sets of data.

* * * * *